(12) United States Patent
Zhang et al.

(10) Patent No.: US 11,930,103 B2
(45) Date of Patent: Mar. 12, 2024

(54) METHOD, USER DEVICE, MANAGEMENT DEVICE, STORAGE MEDIUM AND COMPUTER PROGRAM PRODUCT FOR KEY MANAGEMENT

(71) Applicant: VeChain Global Technology, S.AR.L, Luxembourg (LU)

(72) Inventors: Lei Zhang, Shanghai (CN); Bangya Ma, Shanghai (CN); Jianliang Gu, Shanghai (CN)

(73) Assignee: VeChain Global Technology S.ar.l, Luxembourg (LU)

( * ) Notice: Subject to any disclaimer, the term of this patent is extended or adjusted under 35 U.S.C. 154(b) by 437 days.

(21) Appl. No.: 17/250,837

(22) PCT Filed: Sep. 30, 2019

(86) PCT No.: PCT/IB2019/058292
§ 371 (c)(1),
(2) Date: Mar. 10, 2021

(87) PCT Pub. No.: WO2020/065633
PCT Pub. Date: Apr. 2, 2020

(65) Prior Publication Data
US 2022/0038263 A1 Feb. 3, 2022

(30) Foreign Application Priority Data
Sep. 30, 2018 (CN) .......................... 201811161190.X

(51) Int. Cl.
*H04L 9/08* (2006.01)
*H04L 9/32* (2006.01)

(52) U.S. Cl.
CPC ............ *H04L 9/083* (2013.01); *H04L 9/0825* (2013.01); *H04L 9/085* (2013.01); *H04L 9/0869* (2013.01); *H04L 9/3247* (2013.01); *H04L 9/3263* (2013.01)

(58) Field of Classification Search
CPC ... H04L 9/08; H04L 29/06; H04L 9/32; H04L 9/083; H04L 9/0825; H04L 9/085;
(Continued)

(56) References Cited

U.S. PATENT DOCUMENTS

| 6,411,716 B1 | 6/2002 | Brickell |
| 7,995,765 B2 | 8/2011 | Schneider |

(Continued)

FOREIGN PATENT DOCUMENTS

| CN | 101166089 A | 4/2008 |
| CN | 101425902 A | 5/2009 |

(Continued)

*Primary Examiner* — Abu S Sholeman
(74) *Attorney, Agent, or Firm* — Downs Rachlin Martin PLLC

(57) ABSTRACT

The present disclosure provides methods and devices for key management. In one example, a method of key management comprises: obtaining, at a user device, a number of users in a group of users and a minimum number of users for restoring a transaction key; randomly generating the transaction key; splitting the transaction key into a plurality of sub-keys, the number of sub-keys being the same as the number of users; and sending the plurality of sub-keys to a management device, each of the plurality of sub-keys being encrypted with a public key of a user corresponding to a sub-key.

4 Claims, 6 Drawing Sheets

(58) Field of Classification Search
CPC ... H04L 9/0869; H04L 9/3247; H04L 9/3263; H04L 9/0877; H04L 63/062; H04L 63/08; H04L 9/0643; H04L 9/0861; G06F 21/60; G06F 21/602

See application file for complete search history.

(56) References Cited

U.S. PATENT DOCUMENTS

| | | | |
|---|---|---|---|
| 8,520,854 | B2 | 8/2013 | Schneider |
| 8,713,329 | B2 | 4/2014 | Schneider |
| 9,413,735 | B1 | 8/2016 | Hird |
| 10,699,031 | B2 * | 6/2020 | Chen .................. H04L 9/083 |
| 2005/0013440 | A1 | 1/2005 | Akiyama et al. |
| 2008/0095375 | A1 | 4/2008 | Tateoka et al. |
| 2008/0229396 | A1 * | 9/2008 | Bodepudi ............ H04L 63/08 726/4 |
| 2013/0013931 | A1 * | 1/2013 | O'Hare ................ H04L 9/3231 713/189 |
| 2015/0019870 | A1 | 1/2015 | Patnala et al. |
| 2015/0310436 | A1 | 10/2015 | Lakshmanan et al. |
| 2018/0053009 | A1 * | 2/2018 | Claes ................... H04L 9/0894 |
| 2018/0109372 | A1 | 4/2018 | Fu |
| 2018/0176013 | A1 | 6/2018 | Cheng et al. |
| 2018/0367298 | A1 | 12/2018 | Wright et al. |
| 2019/0220859 | A1 * | 7/2019 | Weight .................... H04L 9/30 |
| 2019/0238311 | A1 * | 8/2019 | Zheng .................... H04L 9/006 |
| 2020/0013052 | A1 * | 1/2020 | Fok ....................... G06Q 20/367 |

FOREIGN PATENT DOCUMENTS

| | | |
|---|---|---|
| CN | 101546407 A | 9/2009 |
| CN | 100550726 C | 10/2009 |
| CN | 101753298 A | 6/2010 |
| CN | 103856478 B | 6/2014 |
| CN | 106027245 A | 10/2016 |
| CN | 106027245 B | 5/2019 |
| WO | 2000019652 A1 | 4/2000 |

* cited by examiner

METHOD, USER DEVICE, MANAGEMENT DEVICE, STORAGE MEDIUM AND COMPUTER PROGRAM PRODUCT FOR KEY MANAGEMENT

FIELD

The present disclosure relates to a method and device for permission management, and more specifically, to a method, user device, management device, non-transient computer readable storage medium and computer program product for key management.

BACKGROUND

In scenarios such as e-commerce, asset partitioning and funds management, a plurality of users are often required to have government and management permission over to-be-processed transactions. In a traditional permission management scheme, a solution of a plurality of signatures is usually employed in order to improve security and prevent a key from being leaked by an individual user owning permission. For example, a plurality of users owning permission take turns encrypting or signing the same transaction with their respective keys.

In the foregoing traditional permission management scheme, a plurality of users owing permission are required to sign or authorize the same transaction in turn, causing the entire transaction process to be rather lengthy. Moreover, each of the users owing permission has his/her respective key, and when any of the users either loses his/her key or refuses to use his/her key for some reason, the transaction might be delayed or stopped. In addition, since keys kept by users owning permission are usually constant for a period of time, there is a high probability that these keys are decrypted.

In view of this, there is a need to build a scheme for managing keys, so that the key government and management involving a plurality of users owning permission will become more secure and/or easier for use.

SUMMARY

The present disclosure provides methods and devices for key management, so that the government and management of keys are made more secure, reliable and convenient for use.

According to a first aspect of the present disclosure, a method of key management is provided. The method comprises: in response to a user being determined as a primary user for splitting a transaction key, obtaining, at a user device of the primary user, the number of users in a group of users and a first predetermined value, the first predetermined value indicating the minimum number of users for restoring the transaction key, the group of users being used to manage the transaction key; randomly generating, based on a message related to a further user from a management device, the transaction key associated with a processing permission of a present transaction, the message related to the further user indicating at least a public key of the further user different from the primary user in the group of users; splitting the transaction key into a plurality of sub-keys, the number of sub-keys being the same as the number of users, each of the plurality of sub-keys corresponding to one user in the group of users; and sending a plurality of encrypted sub-keys to the management device, each of the plurality of encrypted sub-keys being encrypted with a public key of a user corresponding to a sub-key.

According to a second aspect of the present disclosure, a method of key management is further provided. The method comprises: in response to a user being determined as a restoring user for restoring a transaction key, obtaining, at a user device of the restoring user, a restoration message for restoring the transaction key from a management device, the restoration message indicating at least the number of confirming users in a group of users and an identification of the restoring user, the confirming users approving a present transaction, the group of users being used to manage the transaction key; in response to determining the number of confirming users is larger than or equal to a first determined value, determining the transaction key based on sub-keys of confirming users obtained from the management device, the sub-keys of the confirming users being generated by splitting the transaction key in advance; and signing a transaction request for the present transaction based on the determined transaction key.

According to a third aspect of the present disclosure, a method of key management is further provided. The method comprises: obtaining, at a management device, group information about a group of users from a user device of an organizing primary user for creating the group of users, the group information indicating at least the number of users in the group of users and a first predetermined value, the first predetermined value indicating the minimum number of users for restoring a transaction key, the group of users being used to manage the transaction key; sending a message related to a further user to a user device of a primary user for splitting the transaction key, the message related to the further user indicating at least a public key of the further user different from the primary user in the group of users; obtaining a plurality of sub-keys from the primary user, the number of sub-keys being the same as the number of users in the group of users, the plurality of sub-keys being generated by splitting the transaction key by the primary user, and the plurality of sub-keys being encrypted with public keys of respective users; and caching the plurality of sub-keys to be sent to the respective users.

In a fourth aspect of the present disclosure, a user device for key management is further provided. The user device comprises: a memory configured to store one or more computer programs; a processing unit coupled to the memory and configured to execute the one or more computer programs to cause the device to perform a method according to any of the first and second aspects of the present disclosure.

In a fifth aspect of the present disclosure, a management device for key management is further provided. The management device comprises: a memory configured to store one or more computer programs; a processing unit coupled to the memory and configured to execute the one or more computer programs to cause the device to perform a method according to the third aspect of the present disclosure.

In a sixth aspect of the present disclosure, a non-transient computer readable storage medium is further provided. The non-transient computer readable storage medium comprises machine executable instructions stored thereon, the machine executable instructions, when executed, causing a machine to perform a method according to any of the first, second and third aspects of the present disclosure.

In a seventh aspect of the present disclosure, a computer program product is further provided. The computer program product is tangibly stored on a non-transient computer readable medium and comprises machine executable instructions, the machine executable instructions, when executed, causing a machine to perform a method according to any of the first, second and third aspects of the present disclosure.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference numeral usually refers to the same component in the example implementations of the present disclosure.

Throughout the figures, the same or corresponding numeral refers to the same or corresponding part.

DETAILED DESCRIPTION OF IMPLEMENTATIONS

Figure 1:
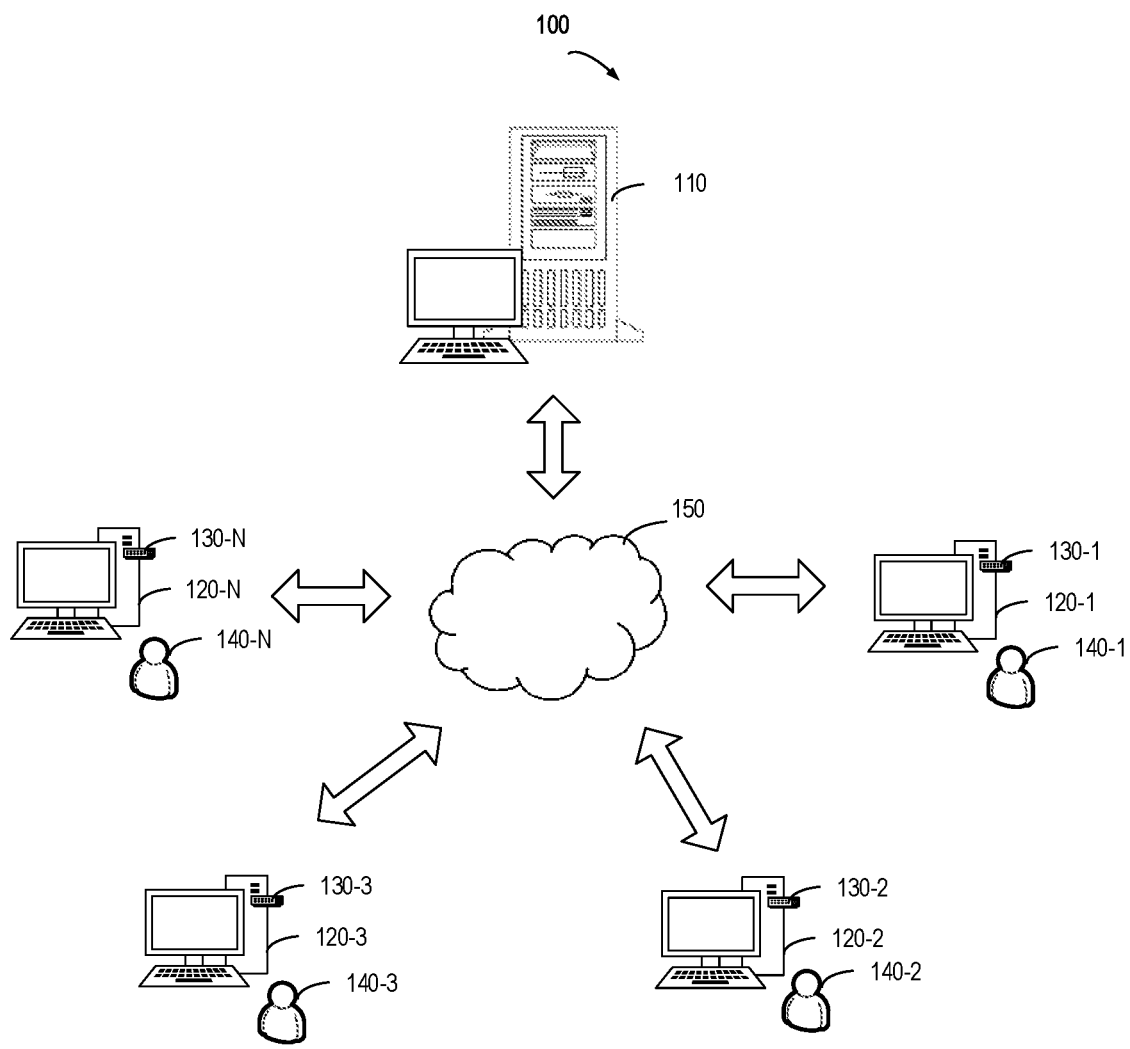
FIG. 1 shows an architecture diagram of a management system 100 for key management according to embodiments of the present disclosure.

Example implementations of the present disclosure are described herein with reference to the accompanying drawings. Although the drawings illustrate certain example implementations of the present disclosure, it should be appreciated that the present disclosure can be implemented in a variety of other ways and is not limited to the implementations disclosed herein. On the contrary, the disclosed implementations are provided to illustrate and convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following also can comprise other explicit and implicit definitions.

As described above, in a traditional permission management scheme, since keys kept by users are constant for a long period of time and a plurality of users need to sign the same transaction with their respective keys in turn, if problems occur with any of the users (e.g., losing his/her key or refusing to use his/her key), the transaction will not proceed smoothly. Therefore, the signing process of a traditional permission management scheme is not secure and convenient enough, and moreover the reliability of such a system is rather low and vulnerable to improper permission usage.

To at least partly solve one or more of the above and other potential problems, embodiments of the present disclosure propose key management schemes. In one example, in response to a user being determined as a primary user for splitting a transaction key, the a method of key management may include obtaining, at a user device of the primary user, the number of users in a group of users and a first predetermined value, the first predetermined value indicating the minimum number of users for restoring a transaction key, the group of users being used to manage the transaction key; the method may further include randomly generating, based on a message from a management device relating to a further user in the group of users, a transaction key for processing a permission of a present transaction, the message related to the further user indicating at least a public key of the further user different from the primary user in the group of users; splitting the transaction key into a plurality of sub-keys, the number of sub-keys being the same as the number of users, each of the plurality of sub-keys corresponding to one user in the group of users; and sending a plurality of encrypted sub-keys to the management device, each of the plurality of encrypted sub-keys being encrypted with a public key of a user corresponding to a sub-key.

In the above scheme, through the transaction key randomly generated by the primary user and split into a plurality of sub-keys, the number of sub-keys being the same as the number of users in the group of users, and each sub-key being encrypted with a public key of a corresponding user of the sub-key, the schemes proposed by example embodiments of the present disclosure not only reduce the risk of the transaction key being prone to decryption as is the case with constant transaction keys. Moreover, since a single user having a sub-key cannot restore the transaction key independently, and the transaction key can only be restored through collaboration with a plurality of the users, the risk that the key is too concentrated is diversified and the security of the transaction key is improved. In addition, by setting the minimum number of users for restoring the transaction key, even when problems occur with an individual user (e.g., losing the sub-key or refusing to use the sub-key), the transaction key can still be restored through collaboration of further users, so that the reliability and robustness of the permission management system is improved. Furthermore, by sending a plurality of encrypted sub-keys to the management device, the management device may cache encrypted sub-keys without synchronized operation of further users in the group of users, allowing for the asynchronous split and distribution of the transaction key among a plurality of users, thereby improving the convenience of the permission management system.

FIG. 1 shows an architecture diagram of an example management system 100 of key management according to embodiments of the present disclosure. As shown in FIG. 1, the management system 100 comprises a management device 110, and a plurality of user devices 120-1, 120-2, 120-3, 120-4 to 120-N (collectively referred to as user device 120 below), the plurality of user devices for example being associated with a plurality of users 140-1, 140-2, 140-3, 140-4 to 140-N (collectively referred to as user 140 below) who manage a transaction key, the users using the user devices as terminal devices to manage the transaction key. The users 140-1 to 140-N jointly own permission over matters such as execution of a transaction or disposal or transfer of an asset and thus may organize into a group of users that manages keys for providing permission to execute such matters. The management device 110 and the plurality of user devices 120-1, 120-2, 120-3, 120-4 to 120-N perform data interaction via a network 150.

The management device 110 is, for example but not limited to, a personal computer, a server or other computing device. The management device 110 may be used, through interaction with user devices 120, for one or more of: to implement an initialization of a user device 120 of each user 140, specify or randomly determine a primary user and/or a restoring user in the group of users, assist an organizing a primary user with organizing the group of users for managing a transaction key, assist the primary user with splitting the transaction key into a plurality of sub-keys, in some examples, the number of sub-keys being the same as the number of users in the group of users, cache and distribute sub-keys, as well as assist the restoring user in restoring the transaction key. Thus, in some examples, one or more of the functions of generating a transaction key, splitting the transaction key into sub-keys, storage of the sub-keys, and restoring the transaction key from the sub-keys is/are performed by user devices 120 and/or hardware security devices 130, which provides increased security as compared to performing one or more of those functions on a central computing device, such as management device 110. Further, in some examples, the transaction key is never stored by the management device 110, thereby improving security.

In some embodiments, the management device 110 determines whether a user device is valid in response to a registration request of the user device, and further determines whether the entire group of users is valid by determining whether a user device of each user in the group of users is valid. In some embodiments, the management device 110 may further be used to obtain, from the primary user, the number of users in the group of users and the minimum number (also referred to in some examples as the first predetermined value) of users for restoring the transaction key, and assist a user device of the primary user, which may be randomly selected, with splitting the transaction key, in some examples, the splitting may include building a polynomial.

The user devices 120-1, 120-2, 120-3, 120-4 to 120-N may be any of a variety of computing devices known in the art, for non-limiting example, conventional cell phones, personal computers, etc. Each user device 120 may include an associated hardware security device 130 (e.g., 130-1, 130-2, 130-3, 130-4 or 130-N) communicatively coupled to a corresponding computing device 120. The hardware security device 130 is, for non-limiting example, a USB key, which, for example, may be operably connected to the user device 120. In some examples, the hardware security device 130 may be used for generating, splitting and/or restoring a transaction key. In other examples, user devices 120 may perform one or more of generating, splitting and/or restoring a transaction key.

In some embodiments, the hardware security device 130 may be configured to create its own asymmetric encryption key pair of public key K and private key P for asymmetric encryption. In some examples, the hardware security device 130 may also be used to create a password for the group of users, randomly generate a transaction key and/or build a polynomial for splitting the transaction key, etc. In one example, hardware security devices 130 may include hardware and software for securely and automatedly performing the transaction key functionalities described herein. Hardware security devices 130 may include any of a variety of security features known in the art, such as containing secure processor(s) that incorporate hardware-based encryption, as well as software and firmware for performing transaction key functions. Hardware security devices 130 may have a hardware architecture that includes an MPU, CPU, co-processor, and crypto RAM. In one example, the hardware security devices 130 include a SecurCore® SC300 processor manufactured by ARM®. The hardware security devices 130 may be configured to be powered via a wired connection ,e.g., USB, to a corresponding user device 120, communicate over network 150 via the user devices 120.

In the following description, the combination of each user device 120 and a corresponding hardware security device 130 associated with the user device 120 as shown in FIG. 1 may also be referred to as simply a user device 120.

In other examples, user device 120 may be an integration of separately designed communication and processing function modules with a general-purpose hardware security device 130. Such a user device 120 may create its own public key K and private key P for asymmetric encryption, and establish mutual trust with the management device 110 by verifying each other, to exchange keys and transaction information. In addition, any of the user devices 120 may further be specified or randomly determined by the management device as the organizing or splitting primary user, restoring user or further user in the group of users.

In some embodiments, one of the user devices 120 may be randomly determined by the management device 110 as the primary user device for organizing the group of users. The primary user device may be configured to determine group information for the group of users, for example, a number, N, of users, and a first predetermined value, M, indicating a minimum number of users required to restore a transaction key, and may be configured to send the group information to the management device 110.

In some embodiments, one of the user devices may be specified or randomly determined by the management device 110 as a user device for splitting the transaction key. The user device for splitting the transaction key may be configured to perform one or more of: randomly generate a transaction key associated with processing a permission of a present transaction, split the transaction key into a plurality of sub-keys, in some examples, the number of sub-keys being the same as the number of users in the group of users, which may be determined from the group information (e.g., the number N of users and the first predetermined value M) from the management device, and send sub-keys, which may, in some examples, be encrypted with public keys of corresponding respective ones of users 120, to the management device.

In some embodiments, one of the user devices may be specified or randomly determined by the management device 110 as a user device of a restoring user for restoring the transaction key. The restoring user device may obtain a restoration message (e.g., including the number of confirming users approving the present transaction and an identification of the restoring user), and after determining the number of confirming users is larger than or equal to the first predetermined value, restore the transaction key based on sub-keys of the confirming users, to sign a transaction request of a present transaction.

Figure 2:
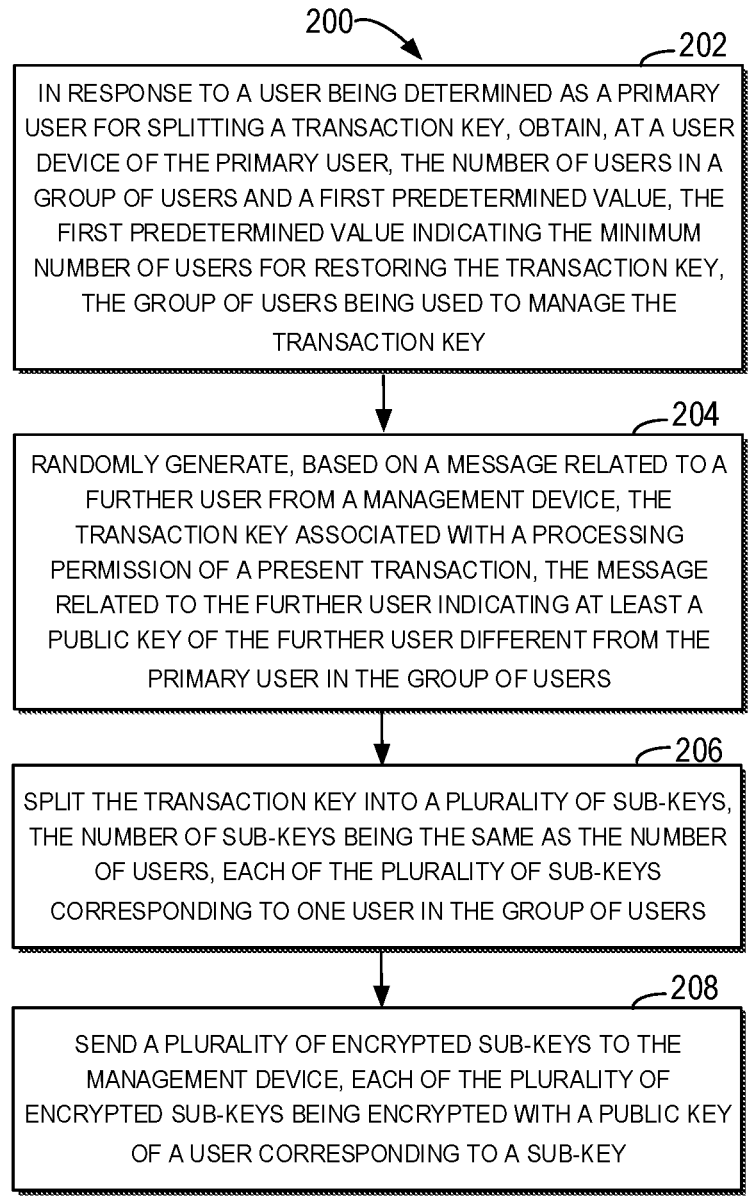
FIG. 2 shows a flowchart of a method 200 of key management according to embodiments of the present disclosure.

FIG. 2 shows a flowchart of an example method 200 of key management according to embodiments of the present disclosure. In FIG. 2, various acts are performed by a user device of a primary user for managing a key. The method 200 may further comprise an additional act which is not shown and/or omit an act which is shown, and the scope of the present disclosure is not limited in this regard.

At block 202, in response to a user being determined as a primary user for splitting a transaction key, obtaining, at a user device 120 of the primary user, the number N of users in a group of users and a first predetermined value, the first predetermined value indicating the minimum number of users for restoring the transaction key, the group of users being used to manage the transaction key. In some embodiments, M is less than the number N of users in the group of users. In some embodiments, the primary user is, for example, specified or randomly determined from the group of users by a management device. In some embodiments, the primary user for splitting the transaction key and an organizing primary user for creating the group of users may be the same user or may be different users. In some embodiments, the user device comprises a hardware USB key with a processing unit.

At block 204, the method may include randomly generating, based on a message from a management device relating to a further user in the group of users, a transaction key for processing a permission of a present transaction, the message related to the further user indicating at least a public key of the further user, the further user being different from the primary user for generating and splitting the transaction key. In the above scheme, by randomly generating the transaction key for processing a permission of a transaction at the user device of the primary user, it is possible to reduce the risk of the transaction key being prone to decryption due to transaction key being constant or used repeatedly.

In some embodiments, the message related to the further user further indicates at least one of: a credential of the management device, signature information for verifying the public key of each of the further users, an identification of the further users, signature information of a hash value of merged data of the further users, and a validity period of the message related to the further users. In one example, each request to generate a transaction key may include a time stamp, such as a UTC time stamp. If the validity period has expired, the user device will not generate a transaction key and the request cannot be reused. Regarding the signature information of a hash value of merged data of the further users, in some embodiments, the management device firstly hash-calculates the following merged data of each of further users in the group of users: a hash value of a credential of the management device, such as a hash of a unique ID and transaction data, a hash value of a unique ID of each further user in the group of users, a hash value of a public key of each of the further users, and a hash value of a signature for the password of the group of users signed by the further user. Then, the hash value of the merged data is signed with a public key of the management device, to verify various data in the message related to the further users by the primary user device. In the above scheme, by including the signed hash value of merged data of the further users in the message related to the further users, it is made convenient for the primary user to verify whether various data in the received message related to the further users has been tampered with or not.

In some examples, the step of randomly generating the transaction key may include, in response to confirming the credential of the management device is valid, determining, based on the signature information of the public key of the further users, whether the public keys of the further users are valid or not; and in response to determining the public keys of the further users are valid, randomly generating a plurality of random numbers for building a splitting polynomial, in some examples, the number of random numbers being the same as the first predetermined value, the plurality of random numbers for building the splitting polynomial comprising the transaction key.

At block 206, splitting the transaction key into a plurality of sub-keys, the number of sub-keys being the same as the number of users, each of the plurality of sub-keys corresponding to one user in the group of users. In some embodiments, splitting the transaction key into the plurality of sub-keys comprises: determining the plurality of sub-keys based on the number of users in the group of users and the plurality of random numbers for building a splitting algorithm, each sub-key comprising first sub-key data and second sub-key data.

Regarding splitting the transaction key, various approaches may be employed. For example, any one of a number of cryptographic secret sharing algorithms may be used, such as Shamir's Secret Sharing, Blakley's scheme, and the Chinese remainder theorem. In some embodiments, the transaction key may be split into a plurality of sub-keys based on an application of Shamir's secret-sharing scheme as shown in the following example splitting polynomial (1):

$$Y = A_0 + A_1 * X + A_2 * X^2 + \ldots + A_{N-1} * X^{M-1} \quad (1)$$

In the above splitting polynomial, M denotes the minimum number of users for restoring the transaction key. $A_0$, $A_1 \ldots A_{M-1}$ denote random numbers for building a splitting algorithm, the above random numbers being randomly generated by the user device of the primary user and the number of random numbers being the same as the minimum number M of users for restoring the transaction key. For example, $A_0$ may denote a transaction key for the present transaction. When $A_0$ to $A_{M-1}$ and M are determined, N (X, Y) pairs may be built, for example, determining $X_1$ to $X_N$, the number of which being the same as the number N of users, N determined Y values, e.g. $Y_1$ to $Y_N$ may be obtained based on the above splitting polynomial. The N (X, Y) pairs determined based on the polynomial, i.e. $(X_1, Y_1), (X_2, Y_2) \ldots (X_N, Y_N)$ denote N sub-keys corresponding to N users in the group of users as resulting from the splitting. Based on the above splitting polynomial, the number N of users in the group of users, the minimum number M of users for restoring the transaction key as well as the random numbers $A_0$ to $A_{M-1}$ randomly generated by the user device of the primary user, the transaction key $A_0$ may be split into N sub-keys $(X_1, Y_1)$, $(X_2, Y_2) \ldots (X_N, Y_N)$, the number of sub-keys being the same as the number of users in the group of users. Each sub-key (X, Y) comprises first sub-key data X and second sub-key data Y.

In the above scheme, by splitting the transaction key $A_0$ randomly generated by the primary user into a plurality of sub-keys, the number of sub-keys being the same as the number of users in the group of users, the risk of the transaction key being prone to decryption due to using a constant transaction key can be effectively avoided. Moreover, since the transaction key cannot be restored independently by a single user owning only one of the sub-keys but only through collaboration from a minimum number (M) of users, the security of the transaction key is significantly increased. In some embodiments, M may also be less than the number N of users in the group of users. By setting the minimum number M of users for restoring the transaction key and letting M<N, the scheme for key management as proposed by example embodiments of the present disclosure is enabled to restore the transaction key through collaboration from M users even when problems occur to an individual user. Therefore, the reliability of the permission management system is improved.

At block 208, sending a plurality of encrypted sub-keys to the management device, each of the plurality of the encrypted sub-keys being encrypted with a public key of a user corresponding to a sub-key. In some embodiments, each of the plurality of encrypted sub-keys being encrypted with the public key of a user corresponding to the sub-key comprises: encrypting the sub-key with the public key of the user corresponding to the sub-key and a validity period of the message related to the further user. In the above scheme, by utilizing the sub-key encrypted by a public key of the corresponding user, the security of each sub-key is increased, and even if some other unauthorized person gains access to the encrypted sub-key, he/she will not be able to decrypt the sub-key as long as he/she does not have access to the private key of the corresponding user. Therefore, the security of the transaction key is increased. In addition, since the encrypted sub-keys are sent to the management device, the management device may cache the encrypted sub-keys, there is no need for synchronization operations of further users in the group of users to receive the sub-keys, therefore the asychronization of split and distribution of transaction key is achieved.

In some embodiments, the method 200 further comprises initialization acts performed by the user device of the primary user. For example, in response to determining signature data from the management device is valid, the user device of the primary user signs the signature data based on a private key in the user device, for example, a preset private key of the user device, the signature data comprising at least a random number signed by the management device; and in response to a user being determined as an organizing primary user for organizing the group of users, the organizing primary user sends to the management device group information about the group of users, a public key of the organizing primary user device as well as the signature data signed with a private key of the organizing primary user device, the group information comprising at least the number of users in the group of users and the first predetermined value. In the above scheme, by verifying the signature information of the management device and sending the signature information signed with the private key of the organizing primary user device of the primary user to the management device for verification, mutual trust between the user device of the primary user and the management device can be achieved, and the security of the permission management system can be improved. In addition, by sending to the management device the group information that comprises the number N of users in the group of users and the first predetermined value M, the management device can use N and M to assist in the processes of splitting and restoring the transaction key.

Figure 3:
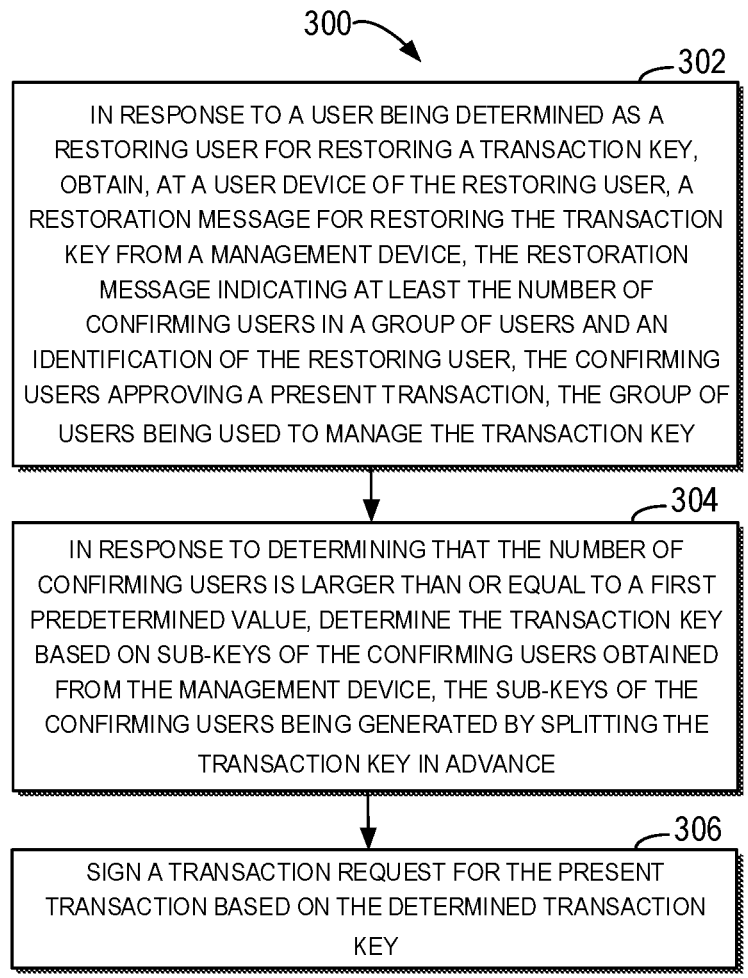
FIG. 3 shows a flowchart of a method 300 of key management according to embodiments of the present disclosure.

FIG. 3 shows a flowchart of a method 300 of key management according to embodiments of the present disclosure. In FIG. 3, various acts are performed for example by a user device of a restoring user for managing keys. The method 300 may further comprise an additional act which is not shown and/or omit an act which is shown, and the scope of the present disclosure is not limited in this regard.

At block 302, in response to a user being determined as a restoring user for restoring a transaction key, obtaining, at a user device of the restoring user, a restoration message for restoring the transaction key from a management device, the restoration message indicating at least the number of confirming users in a group of users and an identification of the restoring user, the confirming users approving the present transaction, the group of users being used to manage the transaction key. In some embodiments, the restoring user is specified or randomly determined by the management device in the group of users. In some embodiments, the restoration message further indicates at least one of: an present transaction random number associated with the present transaction, the sub-keys of the confirming users and the present transaction random number signed with a public key of the restoring user, signature information of the confirming users, a credential of the management device, as well as signature information of a hash value of the restoration message.

At block 304, in response to determining that the number of confirming users is larger than or equal to a first predetermined value, determining the transaction key based on sub-keys of confirming users obtained from the management device, the sub-keys of the confirming users having been previously generated by splitting the transaction key. In some embodiments, the sub-keys of the confirming users are sent by the confirming users to the management device, and in some examples, the sub-keys of the confirming users are encrypted with a public key of the restoring user. In some embodiments, the sub-keys of the confirming users being encrypted with the public key of the restoring user comprises: encrypting, at user devices of the confirming users, with the public key of the restoring user obtained, e.g., via the management device, the sub-keys of the confirming users and a present transaction random number associated with the present transaction. In the above scheme, by encrypting the sub-keys with the present transaction random number associated with the present transaction, the sub-keys can only be used to restore the transaction key of the present transaction, rather than being repeatedly used to restore transaction keys of further transactions.

In one example, after randomly generating a transaction key, the transaction key may be used for a plurality of transactions. In one example, in response to receiving a request for a present transaction, the management device or one of the user devices, e.g., the restoring user device, may be configured to generate a present transaction random number that is then transmitted to all user devices. Confirming user devices may be configured to encrypt the sub-keys with the present transaction random number by calculating a hash of the user device sub-key and the present transaction random number and then encrypting the hashed value with the restoring device's public key. For example, by concatenating the user device sub-key and the present transaction random number, hashing the concatenated value, and then encrypting the result of the hash calculation. Each confirming device may then transmit its sub-key encrypted with the restoring device's public key as well as the encrypted hash of the sub-key and present transaction random number. The restoring device may be configured to decrypt the encrypted data received from the confirming user devices with the restoring user device private key, similarly calculate a hash value of each sub-key and the transaction key for a present transaction, and then compare the hash calculations to the values received. The restoring user device may then be configured to only restore the transaction key for a present transaction if the comparison is verified, indicating each confirming user has approved the present transaction.

In some examples, the confirming user device's encrypted subkeys transmitted by the confirming users to the restoring user include a time stamp. The restoring user device may be configured to restore the transaction key only if the timestamps for each confirming user subkey it receives shows a time within a threshold time period, for example, 24 hours, of performing the transaction key restoration.

In some embodiments, the transaction key may be restored based on the above mentioned splitting polynomial (1). Considering the number of random numbers in the splitting polynomial (1) is M, i.e. $A_0$ to $A_{M-1}$, the transaction key $A_0$ may be obtained by solving the M random numbers $A_0$ to $A_{M-1}$ where sub-keys $(X_1, Y_1), (X_2, Y_2) \ldots (X_M, Y_M)$ of at least M confirming users are obtained.

At block 306, signing, based on the determined transaction key, a transaction request for the present transaction. In some embodiments, a user device of the restoring user sends the signed request for the present transaction to the management device, to execute the present transaction.

In the above scheme, by setting the minimum number of users (i.e. first predetermined value) for restoring the transaction key, and in response to the number of confirming users being larger than or equal to the first predetermined value, restoring, based on the sub-key of the restoring user and the sub-keys of the confirming users, the transaction key, such that the transaction key can be restored based on a collaboration of only a subset of users in the group of users. Therefore, the reliability and robustness of the permission management system is improved, enabling the permission management system to withstand some improper behaviors of permission usage as described above.

Figure 4:
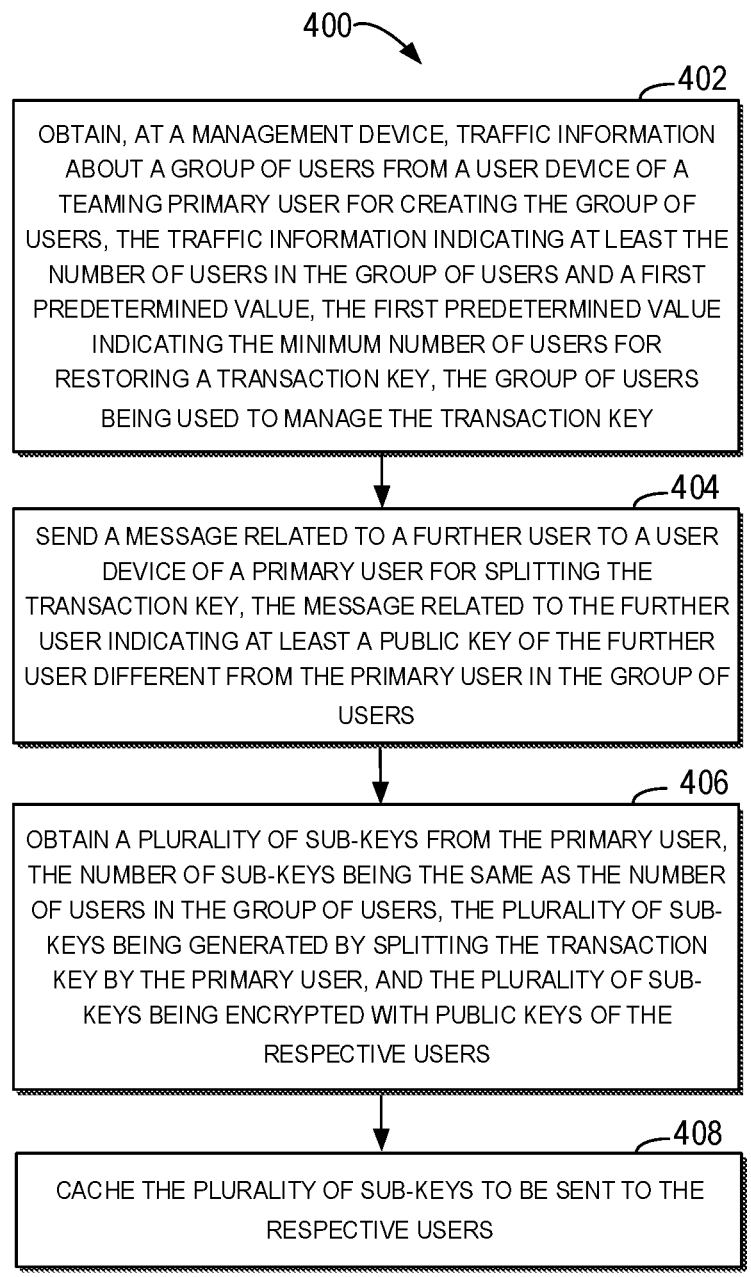
FIG. 4 shows a flowchart of a method 400 of key management according to embodiments of the present disclosure.

FIG. 4 shows a flowchart of a method 400 of key management according to embodiments of the present disclosure. In FIG. 4, various acts are performed for example by the management device 110 for managing keys. The method 400 may further comprise an additional act which is not shown and/or omit an act which is shown, and the scope of the present disclosure is not limited in this regard.

At block 402, obtaining, at the management device, group information about a group of users from a user device of an organizing primary user for creating the group of users, the group information indicating at least the number of users in the group of users and a first predetermined value, the first predetermined value indicating the minimum number of users for restoring a transaction key, the group of users being used to manage the transaction key. In some embodiments, the management device randomly determines in the group of users at least one of: the primary user, and a restoring user for restoring the transaction key. In some embodiments, the primary user is not only the organizing primary user for creating the group of users but also a primary user for splitting the transaction key. In some embodiments, the user device comprises a hardware USB KEY with a processing unit.

At block 404, sending a message related to a further user to a user device of a primary user for splitting the transaction key, the message related to the further user indicating at least public keys of further users different from the primary user in the group of users.

Regarding the group of users being valid, in some embodiments, there is comprised: in response to a registration request from a user device of a user in the group of users, sending signature data of the management device to the user device, the signature data comprising at least a random number signed by the management device; determining, based on signature data from the user device, whether the user device is valid, the signature data being generated by the user device signing the random number with a private key, wherein in some examples, the private key is preset in the user device, in response to determining the management device is valid; and in response to determining that a user device of each user in the group of users is valid, determining that the group of users is valid. In some embodiments, the user device comprises a hardware USB key with a processing unit. In the above scheme, by mutual verification of the management device and a user device of each user in the group of users, mutual trust among user devices in the group of users and the management device can be achieved to increase the security of information exchange.

At block 406, obtaining a plurality of sub-keys from the primary user, the number of sub-keys being the same as the number of users in the group of users, the plurality of sub-keys being generated by splitting the transaction key, e.g., by the primary user, and the plurality of sub-keys being encrypted with, e.g., public keys of the respective users.

At block 408, caching the plurality of sub-keys to be sent to the respective users. In the above scheme, since the management device can cache encrypted sub-keys from the user device of the primary user, the sub-key can be received without synchronous operation performed by the other users in the group of users, and therefore, an asynchronous split and distribution of the transaction key can be achieved.

In some embodiments, the method 400 further comprises: in response to receiving a request for a present transaction, sending, to users in the group of users, transaction information to determine whether the present transaction is approved, the transaction information indicating at least transaction content of the present transaction and an identification of the restoring user; obtaining a sub-key of each confirming user in the group of users, where the confirming users are users that approve the present transaction, the sub-keys of the confirming users being encrypted by being signed with a public key of the restoring user; and in response to determining that a condition for the present transaction is satisfied, sending, to the restoring user, a restoration message for restoring the transaction key. The above-mentioned "a condition for the present transaction being satisfied" is, for example, that the number of confirming users in the group of users is larger than or equal to the first predetermined value, the confirming user approving the present transaction; or may be that a further preset condition about the present transaction is satisfied, for example, a preset execution time of the present transaction is reached. In some embodiments, a sub-key of a confirming user is encrypted with a public key of the confirming user and an present transaction random number associated with the present transaction. In the above scheme, the sub-keys of the confirming users and the present transaction random number associated with the present transaction being encrypted, the sub-key can only be used to restore the transaction key of the present transaction, so that the security of permission management is increased.

Figure 5:
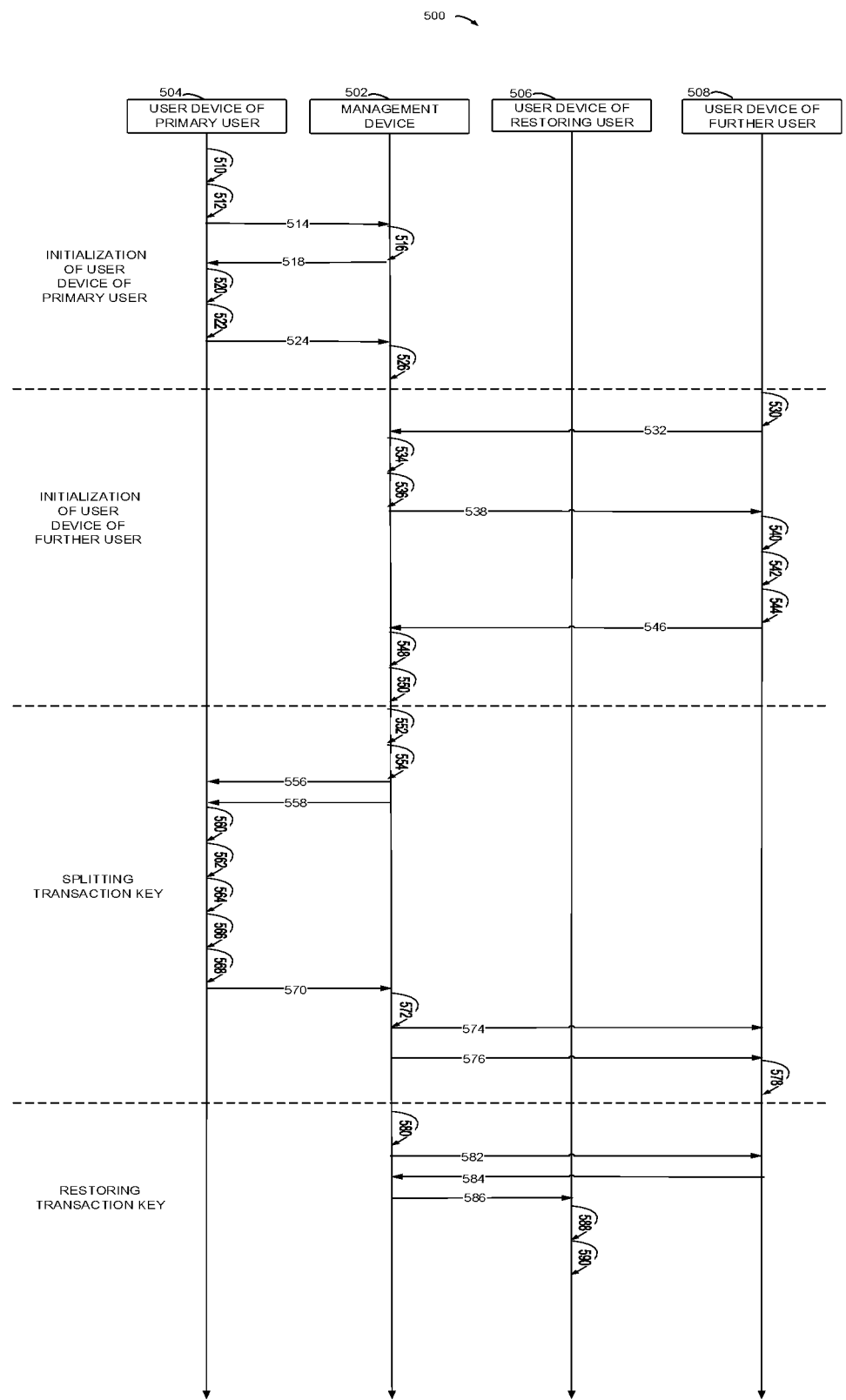
FIG. 5 shows a data flow diagram of a management system 500 of key management according to embodiments of the present disclosure.

FIG. 5 shows a data flow diagram of a management system 500 of key management according to embodiments of the present disclosure. In FIG. 5, various acts are performed for example by a management device 502, a user device 504 of a primary user, a user device 506 of a restoring user, as well as a user device 508 of a further user. The method 500 mainly comprises stages of organizing a group of users (e.g. including initialization of an organizing primary user, initialization of a further user), splitting a transaction key and restoring a transaction key. It should be understood the method 500 may further comprise an additional act which is not shown and/or omit an act which is shown, and the scope of the present disclosure is not limited in this regard. As described herein, the management device 502 may be, for example, the management device 110 described with reference to FIG. 1, and the user devices 504, 506 and 508 may be, for example, the user device 120 described with reference to FIG. 1.

Acts performed in the stage of organizing a group of users are illustrated by way of example below. The stage of organizing the group of users mainly comprises stages of initialization of the organizing primary user and initialization of the further user(s) in a group of users.

Various acts in the initialization of the primary user in the stage of organizing a group of users are illustrated by way of example below.

At the user device 504 of the primary user, at 510, a private key K1 and a public key P1 of the primary user are created. At 512, a password for the group of users is created. At 514, a verification request is sent to the management device 502. The primary user is, for example, specified or randomly determined as an organizing primary user for building a group of users.

At the management device 502, at 516, a random number R1, generated by the management device 502, for verifying the identity of the primary user is signed using a private key KO of the management device. At 518, signature data is sent to the user device 504 of the primary user, the signature data comprising, for example, the random number R1, the signed random number R1 as well as a credential of the management device 502, the credential of the management device 502 comprising, for example, a public key PO of the management device 502.

At the user device 504 of the primary user, at 520, it is determined whether signature data from the management device 502 is valid. For example, it is determined whether the received credential of the management device 502 and the received random number signed by the management device 502 are valid by decrypting the signed random number R1 with the public key PO of the management device 502 and comparing the decrypted random number R1 to the random number R1 received in the signature data. At 522, in response to determining the signature data from the management device 502 is valid, the random number R1 and the password of the group of users are signed using the private key K1 of the user device 504 of the primary user. At 524, group information about the group of users, the public key P1 of the user device 504 as well as the signature data signed with the private key K1 of the user device 504 are sent to the management device 502, the group information comprising at least the number N of users in the group of users and a first predetermined value M.

At the management device 502, at 526, the random number R1 signed with the private key K1 of the user device is verified with the obtained public key P1 of the user device 504, and the password of the group of users is cached.

Various acts in the initialization of a further user in the stage of organizing the group of users are illustrated by way of example below.

In some embodiments, the user device 504 of the primary user may share a link and password of the built group of users with a further user in the group of users by various means. For example, the user device 504 of the primary user shares the link and password of the group of users with a further user in the group of users through a local area network. For example, the user device 508 of a further user is a user device of a further user different from the primary user in the group of users.

At the user device 508 of a further user, at 530, a private key K2 and a public key P2 of the user device 508 of the further user are created. At 532, based on the link and password of the group of users, a connection is established with the management device 502 and a verification request is sent to the management device 502.

At the management device 502, at 534, the following data is merged: a hash value of the credential of the management device, a hash value of the public key P1 of the user device 504 of the primary user, a hash value of a signature for the password of the group of users by the primary user, as well as a random number R2 for verifying the identity of the further user. At 536, a hash value of the merged data is signed using the private key KO of the management device 502. At 538, the credential of the management device 502, the public key P1 of the user device 504 of the primary user, the signature for the password of the group of users by the primary user as well as the random number R2, and the signature for a hash value of the merged data are sent to the user device 508 of further user.

At the user device 508, at 540, it is determined whether the management device 502 is valid. At 542, it is determined whether the public key P1 of the user device 504 of the primary user is valid. At 544, the password of the group of users is signed using the private key K2 of the user device 508, and the random number R2 is signed using the private key K2 of the user device 508. At 546, the public key P2 of the user device 508 and signature data signed with the private key K2 are sent to the management device, the signature data comprising, for example, the password of the group of users and the random number R2 signed with the private key K2.

At the management device 502, at 548, the random number R2 signed with the private key K2 of the user device 508 is verified based on the obtained public key P2 of the user device 508, and the password of the group of users is cached. At 550, all the users in the group of users are numbered.

As shown in the illustrated example, an example method of splitting transaction key may include, at the management device 502, at 552, in response to receiving a request to split a transaction key, a primary user for splitting the transaction key is randomly determined from the group of users. The primary user for splitting the transaction key and the organizing primary user for creating the group of users may be the same user or different users. In the following example, they are the same user at user device 504. At 554, in one example, for each further user in the group of users, the following merged data is hash-calculated: the hash value of the credential of the management device 502, a hash value of the number of further users in the group of users, a hash value of a public key of a further user, as well as a hash value of a signature for the password of the group of users signed by a further user. At 556, a message related to a further user is sent to the user device 502 of the primary user, the message related to a further user indicating at least a public key of a further user different from the primary user in the group of users.

In some embodiments, the message related to a further user further indicates at least one of: the credential of the management device 502, the public key of a further user, the signature for the password of the group of users by a further user, a signature of a hash value of the merged data, as well as a validity period of the message related to a further user. At 558, group information about the group of users is sent to the user device 504 of the primary user, the group information comprising at least the number N of users in the group of users and a first predetermined value M.

At the user device 504 of the primary user, at 560, in response to determining that the credential of the management device 502 is valid, determining whether the public key of a further user is valid based on signature information of the public key of further user. At 562, in response to the public key of the further user being valid, randomly generating random numbers $A_0$ to $A_{M-1}$, the number of the random numbers being the same as the minimum number M of users for restoring the transaction key. $A_0$ denotes the transaction key for the present transaction. At 564, building, based on the minimum number M of users for restoring the transaction key and the random numbers $A_0$ to $A_{M-1}$ randomly generated by the user device 504 of the primary user, a polynomial for splitting the transaction key. At 566, splitting the transaction key $A_0$ into N sub-keys $(X_1, Y_1), (X_2, Y_2) \ldots (X_N, Y_N)$, the number of the sub-keys being the same as the number of users in the group of users, each sub-key corresponding to one user in the group of users. At 568, the user device 504 encrypts each sub-key with a public key of a corresponding user of the sub-key and the validity period. At 570, a plurality of encrypted sub-keys are sent to the management device 502.

At the management device 502, at 572, caching a plurality of encrypted sub-keys $(X_1, Y_1), (X_2, Y_2) \ldots (X_N, Y_N)$. In some embodiments, at 574, notifying the user device 508 of a further user, for example, to insert a corresponding hardware security device (e.g. USB key) 130. At 576, in response to receiving, from the user device 508, a request for distributing a sub-key, sending to the user device 508 of a further user at least one of: the credential of the management device 502, the numbering of a further user, the public key of the primary user, the sub-key, the validity period as well as the hash value signature of the merged data. In the above scheme, since the management device 502 caches encrypted sub-keys and sends a corresponding sub-key in response to a request for distributing a sub-key to a further user in the group of users, asynchronous split and distribution of the transaction key can achieved. Furthermore, synchronous or real-time operation of further users in the group of users is not required, therefore the convenience of the permission management system is improved.

At the user device 508 of a further user, at 578, the credential and public key of the management device 502 are verified, and a corresponding decrypted sub-key is saved. Various acts in the stage of restoring a transaction key are illustrated in FIG. 5 and described below.

At the management device 502, at 580, a restoring user is specified or randomly determined in the group of users. At 582, in response to receiving a request for the present transaction, sending transaction information to users in the group of users to determine whether the present transaction is approved, the transaction information indicating at least transaction content of the present transaction and an identification of the restoring user. At 584, obtaining a sub-key of each confirming user in the group of users, the confirming user approving the present transaction, the sub-keys of the confirming users being signed with a public key of the restoring user. At 586, in response to determining that a condition for the present transaction is satisfied (e.g., the number of confirming users in the group of users is larger than or equal to a first predetermined value, the confirming user approving the present transaction), sending, to the restoring user, a restoration message for restoring the transaction key, the restoration message comprising at least one of: the number of confirming users and the identification of the restoring user, the credential of the management device, transaction data, an present transaction random number associated with the present transaction, the present transaction random number and the sub-key of further users signed with the public key of the restoring user, as well as a hash value for verifying the restoration message.

At the user device 506 of the restoring user, after the restoration message for restoring the transaction key is obtained from the management device, at 588, in response to determining the number of confirming users is larger than or equal to the first predetermined value, determining the transaction key based on the sub-keys of determined users obtained from the management device, the sub-keys of the determined users having been generated by splitting the transaction key in advance as described above in connection with steps 552 to 578. At 590, signing a transaction request for the present transaction with the determined transaction key, to thereby execute the present transaction.

With the above method 500, not only the security of the transaction key can be improved significantly, but also the reliability of the permission management system can be improved since the transaction key can still be restored through collaboration of M users even when problems occur to an individual user.

Figure 6:
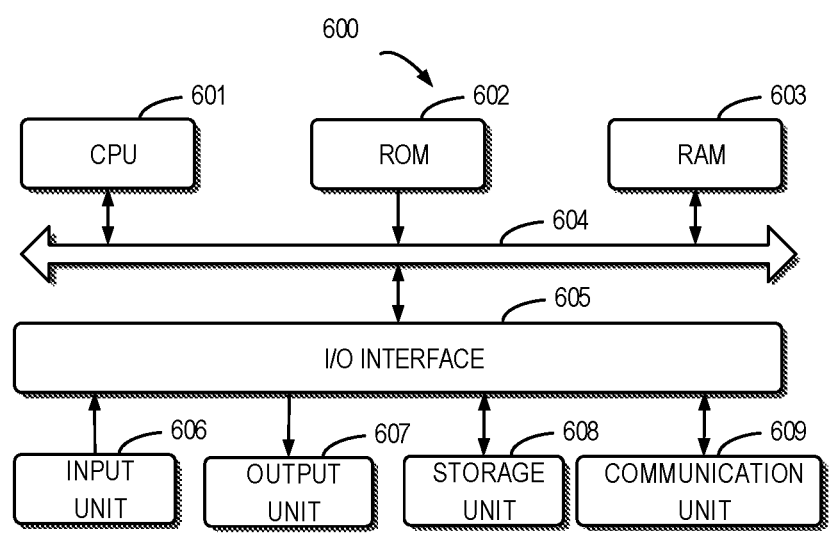
FIG. 6 shows a schematic block diagram of an electronic device 600 which is applicable to implement embodiments of the present disclosure.

FIG. 6 shows a schematic block diagram of an electronic device 600 which is applicable to implement embodiments of the present disclosure. The device 600 may be used to implement one or more hosts in the user device and management device in FIGS. 1 and 5. As shown, the device 600 includes a central process unit (CPU) 601, which can execute various suitable acts and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as keyboard, mouse and the like; an output unit 607, e.g., various kinds of display and loudspeakers etc.; a storage unit 608, such as magnetic disk and optical disk etc.; and a communication unit 609, such as network card, modem, wireless transceiver and the like. The communication unit 609 allows the device 600 to exchange information/data with other devices via the computer network, such as Internet, and/or various telecommunication networks.

The above described each procedure and processing, such as the methods 200, 300, 400 and 500 of key managements, can also be executed by the processing unit 601. For example, in some implementations, the methods 200, 300, 400 and 500 can be implemented as a computer software program stored in the machine-readable medium, e.g., the storage unit 608. In some implementations, the computer program can be partially or fully loaded and/or mounted to the device 600 via ROM 602 and/or the communication unit 609. When the computer program is loaded to the RAM 603 and executed by the CPU 601, one or more operations of the above described methods 200, 300 and 500 can be implemented. Alternatively, in other implementations, the CPU 601 also can be configured in other suitable manners to realize one or more acts of the above methods 200, 300, 400 and 500.

However, those skilled in the art may understand where the user device as described in the present disclosure is a hardware security device 130 integrated with communication and processing function modules, the user device may not include one or more components described with reference to FIG. 6.

The present disclosure can be a method, device, system and/or computer program product. The computer program product can include a computer-readable storage medium, on which the computer-readable program instructions for executing various aspects of the present disclosure are stored.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/acts stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/acts stipulated in one or more blocks of the flow chart and/or block diagram.

The computer-readable program instructions can also be loaded into computer, other programmable data processing apparatuses or other devices, to execute a series of operation steps on the computer, other programmable data processing apparatuses or other devices to generate a computer-implemented procedure. Therefore, the instructions executed on the computer, other programmable data processing apparatuses or other devices implement functions/acts stipulated in one or more blocks of the flow chart and/or block diagram.

The flow chart and block diagram in the drawings illustrate system architecture, functions and operations that may be implemented by system, method and computer program product according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or acts, or by a combination of dedicated hardware and computer instructions.

Various embodiments of the present disclosure have been described above and the above description is only exemplary rather than exhaustive and is not limited to the implementations of the present disclosure. Many modifications and alterations, without deviating from the scope and spirit of the explained various implementations, are obvious for those of ordinary skill in the art. The selection of terms in the text aims to best explain principles and actual applications of each implementation and technical improvements made in the market by each implementation, or enable other ordinary skilled in the art to understand implementations of the present disclosure.

Optional embodiments of the present disclosure have been described above, which are not intended to limit the present disclosure. For those skilled in the art, various alterations and changes may be made to the present disclosure. Any modifications, equivalent replacements and improvements within the spirit and principles of the present disclosure shall be included in the protection scope thereof.

We claim:

1. A method of key management, comprising:
obtaining, at a user device of a primary user for splitting a transaction key, a number of users in a group of users for managing the transaction key and a first predetermined value, the first predetermined value indicating a minimum number of users in the group of users for restoring the transaction key;
randomly generating, based on a message from a management device related to a further user in the group of users, the transaction key, wherein the transaction key is associated with processing a permission of a present transaction, wherein the message includes at least a public key of the further user;
splitting the transaction key into a plurality of sub-keys, the number of sub-keys being the same as the number of users;
encrypting each of the plurality of sub-keys with a public key of a corresponding one of the users in the group of users associated with a given sub-key; and
sending the plurality of encrypted sub-keys to the management device, wherein the message from the management device related to the further user indicates at least one of:
a credential of the management device;
signature information for verifying the public key of the further user;
an identification of the further user;
signature information of a hash value of merged data of the further user; and
a validity period of the message, and
wherein randomly generating the transaction key comprises:
in response to determining that the credential of the management device is valid, determining, based on the signature information of the public key of the further user, whether the public key of the further user is valid; and
in response to the public key of the further user being valid, randomly generating a plurality of random numbers for building a splitting polynomial, the number of random numbers being the same as the first predetermined value, the plurality of random numbers for building the splitting polynomial comprising the transaction key.

2. The method of claim 1, wherein splitting the transaction key into the plurality of sub-keys comprises:
determining, based on the number of users in the group of users and the plurality of random numbers for building the splitting polynomial, the plurality of sub-keys, each of the plurality of sub-keys comprising first sub-key data and second sub-key data.

3. A method of key management with a group of users, the group of users including an organizing primary user for creating the group of users and a primary user for splitting a transaction key, the method comprising:
obtaining, at a management device, group information about the group of users from a user device of the organizing primary user, the group information indicating at least the number of users in the group of users and a first predetermined value, the first predetermined value indicating the minimum number of users for restoring a transaction key, the group of users being used to manage the transaction key;
sending a message to a user device of the primary user for splitting the transaction key, wherein the message is related to a first one of the users in the group of users other than the primary user for splitting the transaction key, wherein the message indicates at least a public key of the first one of the users;
obtaining a plurality of sub-keys from the primary user for splitting the transaction key, the number of sub-keys being the same as the number of users in the group of users, wherein the plurality of sub-keys were generated by the primary user for splitting the transaction key by randomly generating the transaction key and then splitting the transaction key, the plurality of sub-keys being encrypted with public keys of the respective users;
caching the plurality of sub-keys for sending to the respective users;
specifying or randomly determining, in the group of users, at least one of:
at least one of the organizing primary user and the primary user for splitting the transaction key; and
a restoring user for restoring the transaction key;
in response to receiving a request for a present transaction, sending, to users of the group of users, transaction information for determining whether the present transaction is approved, the transaction information indicating at least transaction content of the present transaction and an identification of the restoring user;
obtaining a sub-key of each confirming user in the group of users, the confirming user approving the present transaction, the sub-keys of the confirming users being signed with a public key of the restoring user; and
in response to determining that a condition for the present transaction is satisfied, sending, to the restoring user, a restoration message for restoring the transaction key.

4. A method of key management with a group of users, the group of users including an organizing primary user for creating the group of users and a primary user for splitting a transaction key, the method comprising:
obtaining, at a management device, group information about the group of users from a user device of the organizing primary user, the group information indicating at least the number of users in the group of users and a first predetermined value, the first predetermined value indicating the minimum number of users for restoring a transaction key, the group of users being used to manage the transaction key;
sending a message to a user device of the primary user for splitting the transaction key, wherein the message is related to a first one of the users in the group of users other than the primary user for splitting the transaction key, wherein the message indicates at least a public key of the first one of the users;
obtaining a plurality of sub-keys from the primary user for splitting the transaction key, the number of sub-keys being the same as the number of users in the group of users, wherein the plurality of sub-keys were generated by the primary user for splitting the transaction key by randomly generating the transaction key and then splitting the transaction key, the plurality of sub-keys being encrypted with public keys of the respective users;

caching the plurality of sub-keys for sending to the respective users;

in response to a registration request from a user device of a user in the group of users, sending signature data of the management device to the user device, the signature data comprising at least a random number signed by the management device;

determining, based on signature data from the user device, whether the user device is valid, the signature data being generated by signing the random number by the user device based on a private key preset in the user device in response to determining that the management device is valid; and in response to determining that a user device of each user in the group of users is valid, determining that the group of users is valid.

* * * * *